US006753921B1

(12) United States Patent
Shimizu (10) Patent No.: US 6,753,921 B1
(45) Date of Patent: Jun. 22, 2004

(54) CAMERA AND CAMERA SYSTEM (75) Inventor: Saori Shimizu, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/458,213

(22) Filed: Dec. 9, 1999

(30) Foreign Application Priority Data

Dec. 14, 1998 (JP) ............................................ 10-354542

(51) Int. Cl.$^7$ ............................ H04N 5/225; G06F 1/26; G06F 1/28
(52) U.S. Cl. .................... 348/372; 348/207.1; 713/320; 713/330
(58) Field of Search ............................... 348/372, 207.1, 348/207.11, 552; 713/300, 310, 320, 323, 324, 330, 340

(56) References Cited

U.S. PATENT DOCUMENTS

| | | | | |
|---|---|---|---|---|
| 4,724,456 A | * | 2/1988 | Ishimura et al. ............... | 396/62 |
| 5,523,857 A | * | 6/1996 | Fukushima ................. | 386/125 |
| 5,589,719 A | * | 12/1996 | Fiset ........................... | 307/131 |
| 5,727,169 A | * | 3/1998 | Calzi ........................... | 710/104 |
| 5,799,196 A | * | 8/1998 | Flannery ..................... | 713/320 |
| 5,832,286 A | * | 11/1998 | Yoshida ....................... | 713/324 |
| 5,894,579 A | * | 4/1999 | Fujihara ...................... | 713/324 |
| 5,903,764 A | * | 5/1999 | Shyr et al. ................... | 713/300 |
| 5,917,545 A | * | 6/1999 | Kowno et al. ............ | 348/231.9 |
| 6,060,789 A | * | 5/2000 | Yamaguchi .................. | 307/66 |
| 6,061,092 A | * | 5/2000 | Bakhle et al. ............... | 348/243 |
| 6,151,652 A | * | 11/2000 | Kondo et al. ............... | 713/300 |
| 6,237,106 B1 | * | 5/2001 | Koyama et al. ............ | 713/502 |
| 6,526,516 B1 | * | 2/2003 | Ishikawa et al. ............ | 713/340 |
| 6,577,338 B1 | * | 6/2003 | Tanaka et al. .............. | 348/372 |
| 2001/0001563 A1 | * | 5/2001 | Tomaszewski .............. | 348/552 |
| 2001/0003205 A1 | * | 6/2001 | Gilbert ........................ | 713/320 |

FOREIGN PATENT DOCUMENTS

| JP | 11252489 A | * | 9/1999 | .......... H04N/5/765 |
|---|---|---|---|---|
| JP | 2000020176 A | * | 1/2000 | ............. G06F/1/26 |

OTHER PUBLICATIONS

Universal Serial Bus Usage Tables for HID Power Devices. Release 1.0. Nov. 1, 1997. USB Implementers Forum.*
Patent Abstracts of Japan, Publn. No. 10–75390 dated Mar. 17, 1998.
Patent Abstracts of Japan, Publn. No. 10–136245 dated May 22, 1998.

* cited by examiner

*Primary Examiner*—Andrew Christensen
*Assistant Examiner*—Brian Genco
(74) *Attorney, Agent, or Firm*—Frishauf, Holtz, Goodman & Chick, P.C.

(57) ABSTRACT

The present invention provides a camera which can prevent interruption of the communication operations caused by shortage of battery capacity, during the communication between the camera and an external device such as a personal computer or the like, and which does not require an external power supply during the communication. That is, the present invention relates to a camera which has a built-in power supply, which is capable of making communication with the external device via the communication contact, and which has a body control circuit for detecting whether the external device is connected or not and selecting any one of the built-in power supply and a power supply of the external device in accordance with the result of the detection to supply the power to circuits of the camera.

2 Claims, 10 Drawing Sheets

CAMERA AND CAMERA SYSTEM

BACKGROUND OF THE INVENTION

The present invention relates to a camera capable of making communication with an external device via interface of various standards.

Various techniques for allowing a camera and a personal computer to make mutual communication via the serial interface have been developed.

For example, Jpn. Pat. Appln. KOKAI Publication No. 10-75390 and Jpn. Pat. Appln. KOKAI Publication No. 10-136245 disclose the technique relating to a camera system which allows a camera and a personal computer to make communication via the serial interface of the standards such as RS232, USB, IEEE1394 or the like to exchange the image data.

In this communication, the camera has made various kinds of communication operations by a power supply such as a lithium battery, an alkaline battery and the like provided in the camera body, or by a domestic power supply fed via a DC adapter.

However, when the communication operations are made by the power supply of, for example, a lithium battery or an alkali battery, provided in the camera body, inconvenience that the battery capacity becomes short during the communication operations and interrupts the operations has occurred. In this case, the communication could not be made again without exchanging the battery.

Further, in a digital camera, for example, large power is consumed. Therefore, it is connected to the domestic power supply via a DC adapter when the communication operations and the like are made. However, when the communication operations are made by the domestic power fed via the DC adapter, connection of the DC adapter needs to be made besides the connection of the serial interface, which requires complicated works.

On the other hand, today, the USB, IEEE1394 and the like of the serial interface standards have a power supply terminal (for example, a 5-V power supply in the USB) and a GND terminal, and users have expected use of these terminals. In the above prior art, however, feeding the power from a personal computer via the serial interface has not been suggested at all.

A CCD camera which always receives the power from the only personal computer has been already developed. However, it has not accompanied a power supply operated independently thereof, and therefore, the use of the camera has been limited.

BRIEF SUMMARY OF THE INVENTION

The present invention is accomplished by considering the above-described problems, and its object is to provide a camera which can prevent interruption of the communication operations caused by shortage of battery capacity, during the communication between the camera and an external device such as a personal computer or the like, and which does not require an external power supply during the communication.

To achieve the object, there is provided, as the first embodiment of the present invention, a camera having a power supply and an electric circuit operated by the power supply, and comprising: a connector section which comprises a terminal for communication with the personal computer and a power supply terminal for receiving power from a power supply in the personal computer, and which makes connection with a personal computer; a detection circuit for detecting that the personal computer is electrically connected to the connector section; and a power supply control circuit for controlling to supply the power from the power supply in the personal computer, instead of the power supply in the camera, to the electric circuit when the detection circuit detects the connection of the personal computer.

As for the second embodiment, there is provided a camera comprising: a power supply; a plurality of camera operation means for executing a predetermined camera operation; connector means for making connection to a personal computer; detection means for detecting that the personal computer is electrically connected to the connector means; and power supply control means for controlling to selectively supply power from any one of the power supply in the camera and the power supply of the personal computer to the camera operation means. The connector means comprises a power supply terminal for receiving power from a power supply in the personal computer. The power supply control means selects the built-in power supply when the personal computer is not connected to the connector means and selects the power supply in the personal computer when the connection of the personal computer is detected by the detection means.

As for the third embodiment, there is provided a camera having a power supply and a circuit operated by the power supply, and comprises: connector means which comprises a terminal for communication with the computer and a power supply terminal for receiving power from a power supply in the computer, and which makes electric connection to a computer, and power supply control means which controls to supply power from the power supply in the computer instead of the power supply in the camera to the circuit when the computer is connected.

As for the fourth embodiment, there is provided a camera comprising: a camera operation mechanism for executing a predetermined camera operation; a power supply; a connector section which comprises a power supply terminal for receiving power from a power supply in the external device, and which makes electric connection to an external device; a detection circuit for detecting that the external device is connected to the connector section; and a power supply control circuit for selecting any one of the power supply in the camera and the power supply in the external device, as a power supply for the camera operation mechanism, in accordance with a result of the detection of the detection circuit.

As for the fifth embodiment, there is provided a camera comprising: a plurality of electric circuits for executing a predetermined camera operation; a power supply which is built in the camera; a connection terminal for making connection to external devices including a power supply; and a power supply control circuit for selecting any one of the power supply in the camera, and the external device power supply connected via the connection terminal, as a power supply for the plurality of electric circuits.

AS for the sixth embodiment, there is provided a camera system having a camera and an external device which can be connected to the camera. The external device comprises: an external device side communication terminal for making electric connection with the camera; and a power supply circuit. The camera comprises: a camera side connection terminal for making electric connection with the external device; a plurality of electric circuits for executing a predetermined camera operation; a power supply which is built in the camera; and a power supply control circuit for selecting any one of the power supply in the camera, and the external device power supply connected via the connection terminal, as a power supply for the plurality of electric circuits.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described below with reference to the figures.

Figure 1:
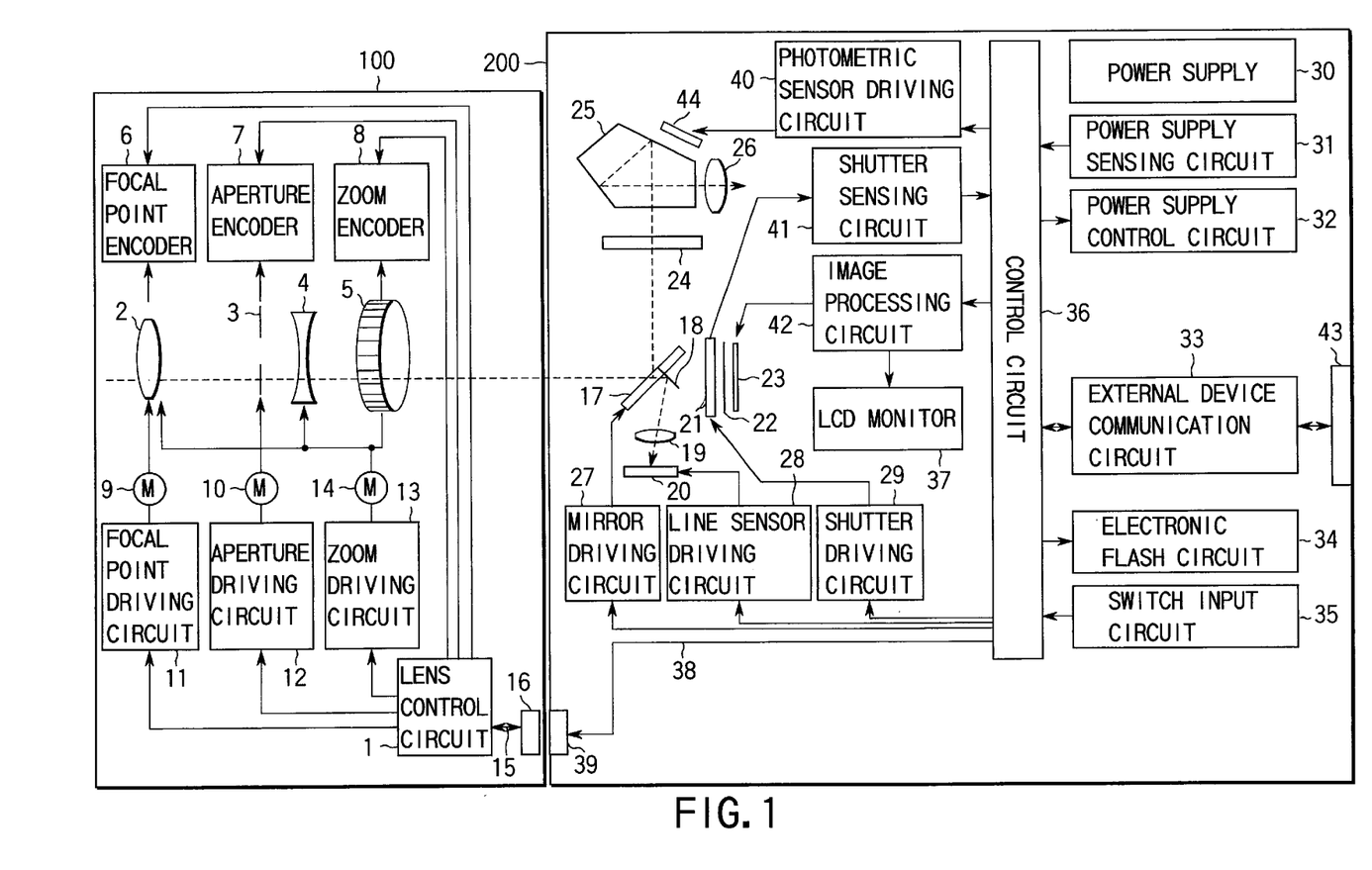
FIG. 1 is a block diagram showing a structure of a camera according to a first embodiment of the present invention.

FIG. 1 is a block diagram showing a structure of a camera according to the first embodiment of the present invention. This camera comprises a digital camera body 200 and an interchangeable lens 100 serving as a zoom lens detachable from the digital camera body 200.

It is needless to say, however, that the camera may be constituted in a combination lens-body type.

First, the structure of the interchangeable lens 100 will be explained in detail.

In FIG. 1, image pickup lenses for forming a subject image consists of a positive lens 2 and a negative lens 4. An aperture mechanism 3 is arranged between the positive lens 2 and the negative lens 4. The aperture mechanism 3 is driven by an aperture motor 10 operated on the basis of the output of an aperture driving circuit 12. An initial position and a stopping position of the aperture mechanism 3 are detected by an aperture encoder 7. The position information detected by the aperture encoder 7 is input to a lens control circuit 1 and fed back from the lens control circuit 1 to the aperture driving circuit 12.

The positive lens 2 is driven by a lens motor 9 operated on the basis of the output of a focal point driving circuit 11. An initial position and a stopping position of the positive lens 2 are detected by a focal point encoder 6. The position information detected by the focal point encoder 6 is input to the lens control circuit 1 and fed back from the lens control circuit 1 to the focal point driving circuit 11.

A zoom operation knob 5 used by an operator to execute zooming is provided behind the negative lens 4. The image pickup lenses (i.e. the positive lens 2 and the negative lens 4) are driven by operation of the zoom operation knob 5 or by a zoom motor 14 operated on the basis of the output of a zoom driving circuit 13. The focal length varied together with the zoom drive is detected by a zoom encoder 8 at any time. The position information detected by the zoom encoder 8 is input to the lens control circuit 1 and fed back from the lens control circuit 1 to the zoom driving circuit 13.

As described above, the image pickup lenses (i.e. the positive lens 2 and the negative lens 4) are moved and the focal length is varied, in synchronization with the rotation of the zoom operation knob 5 or the drive of the zoom motor 4. The focal point driving circuit 11, the aperture driving circuit 12 and zoom driving circuit 13 are subject to centralized control by the lens control circuit 1 on the basis of the output of the focal point encoder 6, the aperture encoder 7 and the zoom encoder 8. Further, the lens control circuit 1 executes a predetermined communication with the digital camera body 200 having a structure described later, via a communication line 15 and a communication contact 16.

Next, the structure of the digital camera body 200 will be described in detail.

In FIG. 1, the subject light which has passed through the interchangeable lens 100 is made incident on a movable mirror 17 having a substantially central portion shaped in a half mirror. At the center of the back of the movable mirror 17, a sub-mirror 18 for reflecting the subject light toward the lower side of the movable mirror 17 is provided. A separator optical system 19 consisting of two optical systems for two-image separation is arranged along the reflecting optical axis of the sub-mirror 18 and also in the vertical direction in the figure. It should be noted that showing is simplified for convenient explanations. A line sensor 20 is arranged at the position of the subject image formed by the separator optical system 19. The line sensor 20 is electrically connected to a line sensor driving circuit 28.

A focal point detecting apparatus employing a well-known phase difference method is constituted by the sub-mirror 18, the separator optical system 19, the line sensor 20 and the like.

A body control circuit 36 obtains a distance between the two images in accordance with the signal input via the line sensor driving circuit 28 and thus obtains a focusing point. To drive the image pickup lens (i.e. the positive lens 2) toward the focusing position, the quantity of drive of the positive lens 2 in the interchangeable lens 100 is calculated and the drive quantity data is transmitted to the interchangeable lens 100 via the communication line 38 and the communication contact 39. The lens control circuit 1 receiving the drive quantity data provides a predetermined focal point drive and adjustment of the focusing point.

On the other hand, a focusing glass 24, a pentagonal prism 25 and a finder eyepiece optical system 26 are arranged in the reflecting optical path of the movable mirror 17. The reason why the finder eyepiece optical system 26 is provided besides an LCD monitor 37 to monitor the subject is as follows. When a camera operator executes the image pickup operation while watching an optical finder, rather than executing the image pickup operation while watching the LCD monitor 37, the holding characteristics of the camera can be enhanced, which can hardly cause the camera movement.

The movable mirror 17 is driven by a mirror driving circuit 27 and a shutter 21 is driven by a shutter driving circuit 29. An optical lowpass filter 22, and an area sensor 23 for picking up the subject image and converting it into an image signal are arranged behind the shutter 21.

When the movable mirror 17 is moved up and the shutter 21 becomes in an opened state, the subject image is formed on the area sensor 23, and the image pickup operation is started in accordance with a predetermined timing signal. When the image pickup operation is terminated, the shutter 21 becomes in a closed state. The area sensor 23 is controlled by an image processing circuit 42, so that the formed subject image is converted into an analog video signal, which is output to the image processing circuit 42. The structure and function of the image processing circuit 42 will be explained later in detail, together with its peripheral circuits.

A switch input circuit 35, and an electronic flash circuit 34 for illumination of the subject are further provided in the digital camera body 200. The switch input circuit 35 detects the states of a plurality of switches such as operation switches, electronic dials, lens mounting switches, and the like (not shown) and input them to a body control circuit 36. The electronic flash circuit 34 emits predetermined auxiliary light onto the subject.

In addition, a photometric sensor 44 for measuring the brightness of the subject is provided at a predetermined position above the pentagonal prism 25 and the finder eyepiece optical system 26. The photometric sensor 44 measures the brightness of the subject light, under the control of a photometric sensor driving circuit 40. When the interchangeable lens 100 having the structure as explained above is mounted, the digital camera body 200 is capable of making communications with the interchangeable lens 100 via the communication line 38 and the communication contact 39.

Further, a communication contact 43 to be connected to external devices is provided in the digital camera body 200. When external devices are actually connected thereto, the communications and data exchange with the external devices via the communication contact 43 and an external device communication circuit 33 can be realized. A mounting detecting circuit (not shown) also exists in the communication contact 43, to detect whether external devices are connected to the communication contact 43 and transmit the result of the detection to the body control circuit 36. The communication contact 43 is constituted by communication data lines and power supply terminals, so as to receive the power from external devices.

As for the external devices, for example, personal computers, printers, and the like are expected. It is needless to say, however, that the external devices are not limited to these. As for the communication contact 43, for example, USB, IEEE1394, and the like can be employed and, in this case, the communication contact 43 can be connected to external devices via their own connection lines.

A body power supply 30 supplies the power to each circuit in the digital camera body 200. A power supply sensing circuit 31 detects the state of the body power supply 30 and inputs the result of the detection to a body control circuit 36. A power supply control circuit 32 controls the power to be supplied to each section of the digital camera body 200, under the control of the body control circuit 36. The connection of the body power supply 30, the power supply control circuit 32, the power supply sensing circuit 31, the power supply terminals of the communication contact 43, and the like, and the structure of their peripheral circuits, will be described later in detail.

Figure 2:
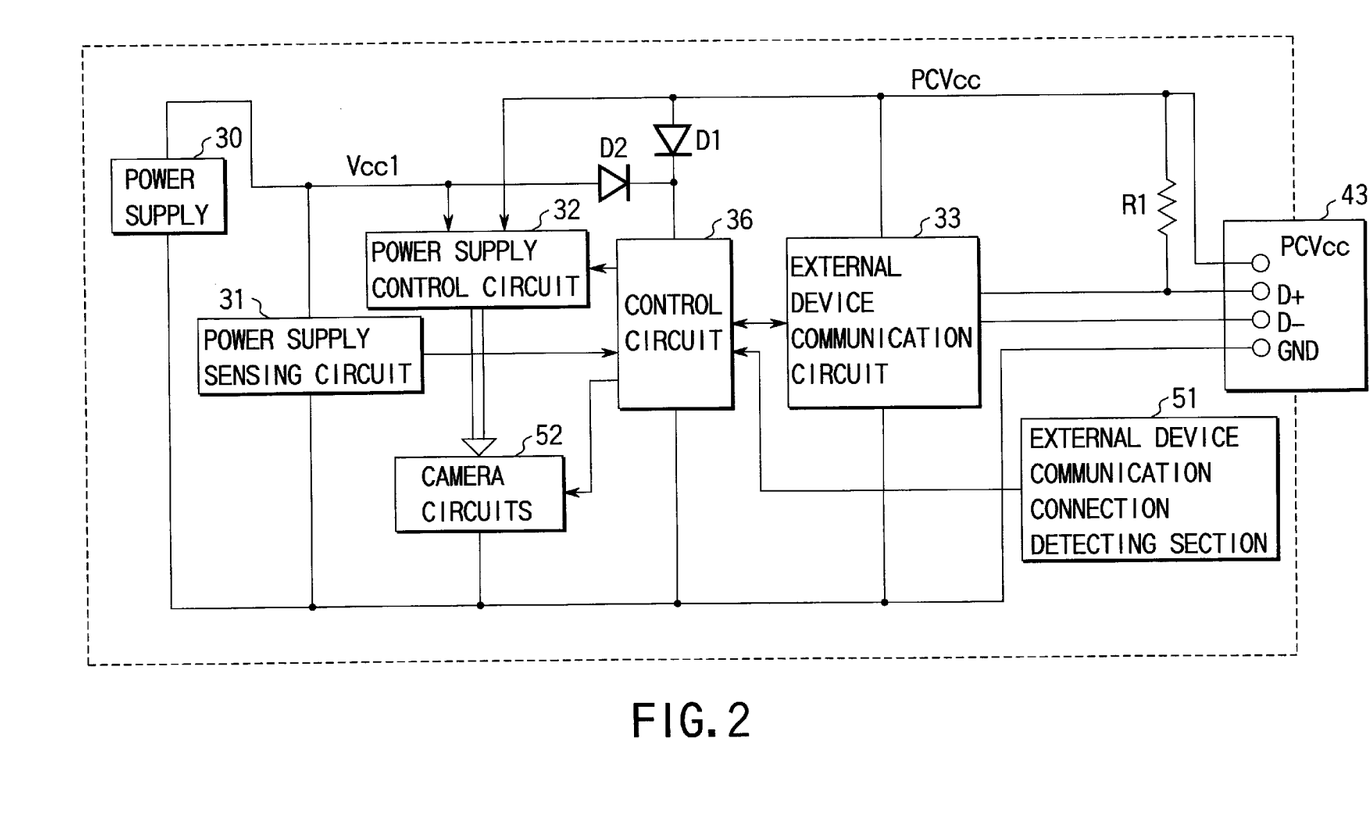
FIG. 2 is a diagram showing the details of the structure around power supplies Vccl and PCVcc, and the communication contact of a digital camera body 200.

Next, FIG. 2 shows the details of the structure around power supplies Vcc1 and PCVcc, and the communication contact of a digital camera body 200.

As shown in FIG. 2, the body control circuit 36 is connected to the power supply Vcc1 in the digital camera body 200 via a diode D2 and also to the power supply PCVcc to which the power is supplied from the power supply terminal of the communication contact 43, via a diode D1, so as to be able to receive the power from both the power supplies. Therefore, even when the power supply Vcc1 in the digital camera body 200 cannot supply the power, the body control circuit 36 can be operated by the power from the power supply PCVcc.

The power supplies Vcc1 and PCVcc are also connected to the input of the power supply control circuit 32. The power supply control circuit 32 can supply the power from either of the power supplies to various camera circuits, under the control of the body control circuit 36.

In the present embodiment, serial interface such as USB or the like is conceived. If the serial interface (for example, IEEE1394) capable of supplying a higher voltage is employed, a step-down circuit is provided separately.

In addition, the stability of the power supply can be further kept if an overcurrent protective element such as a poly-switch is provided between the power supply terminal of the communication contact 43 and the power supply PCVcc of the external power supply line, though it is not used in the present embodiment.

Various electric circuits such as the image processing circuit 42, the LCD monitor 37 and the like, as shown in FIG. 1, are contained in the camera circuits 52.

Although the details are omitted in FIG. 2, a single power supply line is not constituted, but various kinds of power supply lines are constituted in accordance with the circuit characteristics, between the power supply control circuit 32 and the camera circuits 52, so that different powers can be supplied separately in each circuit block, under the control of the power supply control circuit 32. The power supply Vcc1, also connected to the power supply sensing circuit 31, can sense the state of the camera power supply at any time.

Communication contacts D− and D+ of the communication contact 43 are connected to the input of the body control circuit 36 via the external device communication circuit 33, and thereby the communications between the body control circuit 36 and external devices (not shown) can be made.

An external device communication connection detecting section 51 detects whether an external device (not shown) is connected to the communication contact 43 or not, and transmits the result of the detection to the body control circuit 36.

Figure 3:
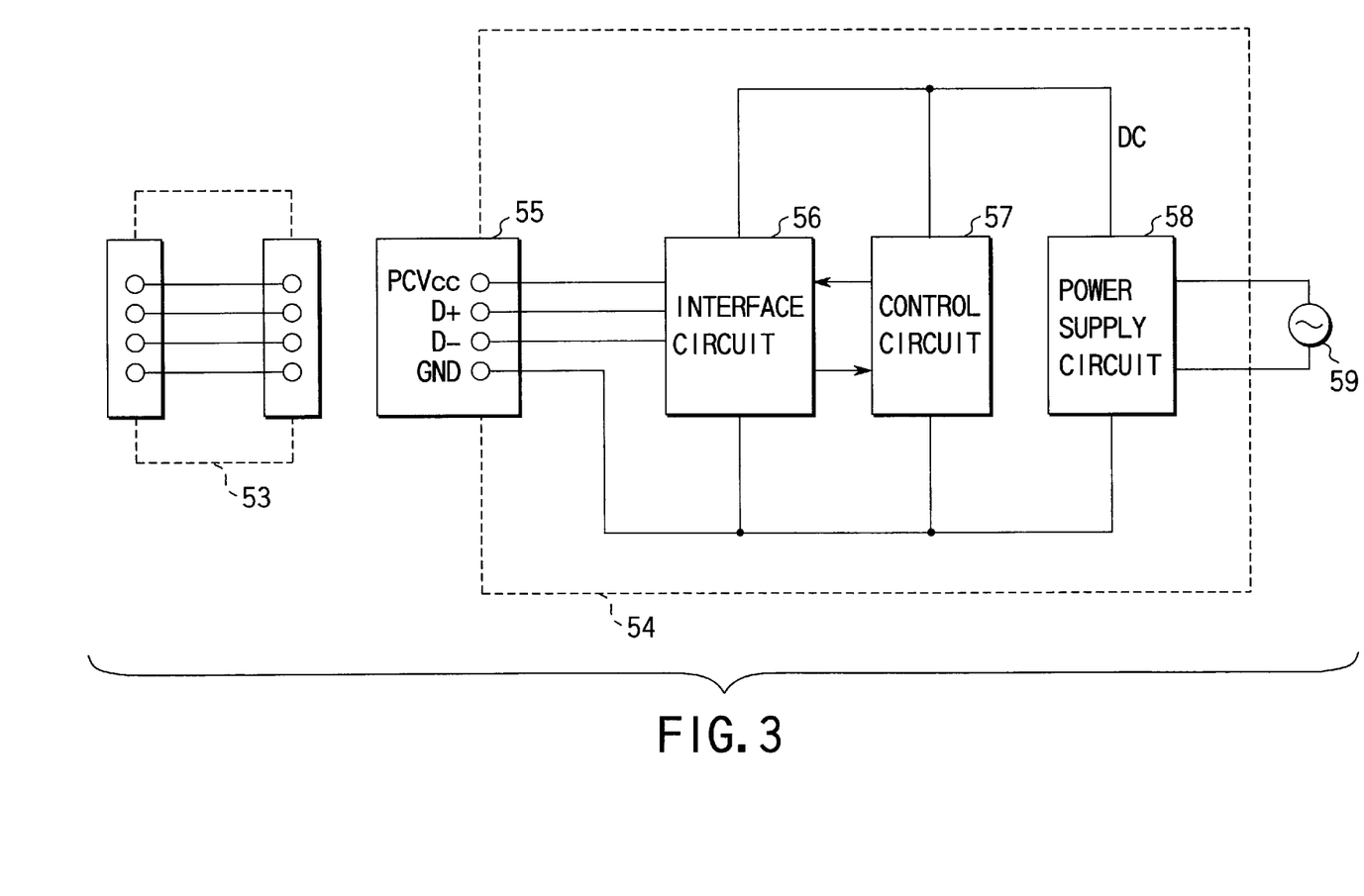
FIG. 3 is a diagram showing the details of a structure an external device 54 connected to a communication contact 43 of the digital camera body via a connection cable 53.

The connection of the external device may be detected by use of mechanical switches, or may be detected on the basis of the result of communications between the external device and the digital camera body 200. The present embodiment employs a manner of monitoring the voltage of the power supply PCVcc of the external device and thereby electrically detecting the connection, as shown in FIG. 3. In addition, a resistor R1, provided to change the communication speed, is pulled up at the communication contact D+, so as to be applicable to the specifications of the USB.

FIG. 3 is a diagram showing the details of a structure of an external device 54 connected to the communication contact 43 of the digital camera body via a connection cable 53.

As shown in the figure, the external device 54 is driven by an AC power supply 59. The AC power supply 59 is connected to a power supply circuit 58, so that the AC voltage is fed to a control circuit 57 and an interface circuit 56. The control circuit 57 is a circuit for controlling the operations of external devices including a CPU. The interface circuit 56 is a circuit for making data communications with a camera. The power is supplied from the PCVcc and a GND terminal of a communication contact 55 to the camera. The interface circuit 56 converts the DC voltage of the power supply circuit 58 to the voltage for the camera and supplies it via the power supply terminal PCVcc. Further, the control circuit 57 makes data communications with the camera via terminals D+ and D− of the communication contact 55.

Figure 4:
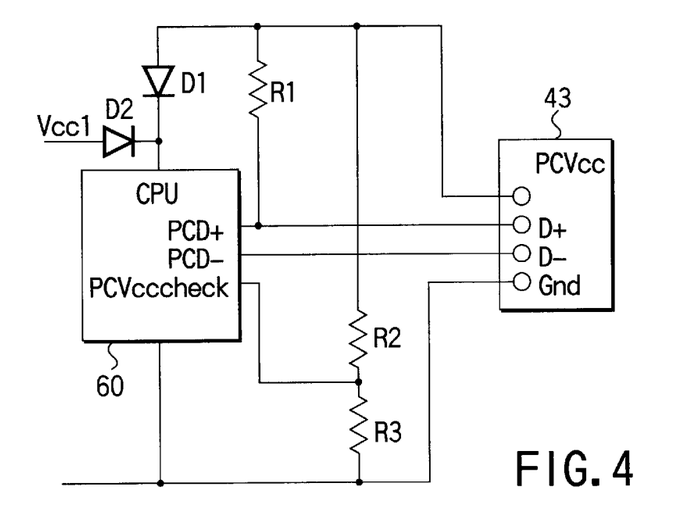
FIG. 4 is a diagram showing the details of an external device communication section and an external device mounting detecting section of the camera according to the first embodiment.

Next, FIG. 4 is a diagram showing the details of an external device communication section and an external device mounting detecting section of the camera according to the first embodiment.

In FIG. 4, a CPU 60 corresponds to the body control circuit 36 or the external device communication circuit 33 in FIG. 2. The CPU 60 executes various controls. The communication contacts D− and D+ of the communication contact 43 are directly connected to the input of the CPU 60, so that the communications can be made between the CPU 60 and the external device via the communication contacts D− and D+.

In the present embodiment, the CPU 60 can set the communication terminal to an open drain. Therefore, even if there is a little difference between the power supply of the digital camera body 200 and that of the external device, communications with the external device can be made without providing a special circuit.

Moreover, the interval between the communication contact D+ and the power supply terminal PCVcc of the external device is pulled up by the resistor R1. The reason is that the type of the communication contact 43 is based on the USB standards in the present embodiment, and according to the USB standards, the external device detects which of the communication contacts D+ and D− pulled up to the power supply of the external device and determines the communication speed on the basis of the result of the detection.

The voltage of the power supply PCVcc of the communication contact 43 is input to the power supply terminal of the CPU 60 via the diode D1. The voltage is also divided by the resisters R2 and R3 and applied to a terminal PCVc-ccheck serving as the input terminal of the CPU 60. When the voltage is applied to the terminal PCVcc, the voltage divided by the resisters R2 and R3 is input to the CPU 60 and the voltage of the terminal PCVcccheck rises from the ground level. For this reason, the CPU 60 can detect the mounting of the external device by detecting the rise of the voltage at the terminal PCVcc or monitoring the level of the voltage at the terminal PCVcc.

When the connection cable which connects the camera to the external device is mounted on the communication contact 43, the mounting of the external device may be detected by sensing the displacement of the mechanism interlocking the mounting by switches.

Figure 5:
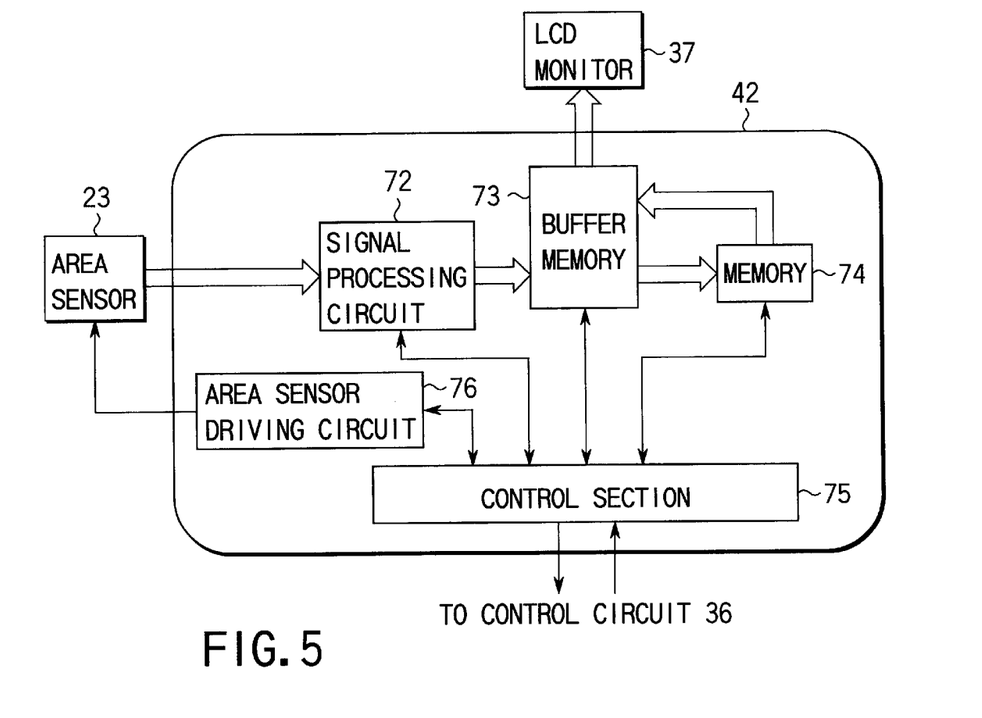
FIG. 5 is a diagram showing the details of a structure of an image processing circuit 42.

Next, FIG. 5 shows the details of the structure of the image processing circuit 42.

In FIG. 5, operations relating to the image processing are controlled in the image processing circuit 42, under the control of a control section 75 controlled by the body control circuit 36 of the digital camera body 200. The area sensor 23 converts the formed subject image into an analog video signal and outputs it to the image processing circuit 42.

In the image processing circuit 42, a signal processing circuit 72 provides a predetermined signal processing including the conversion of the analog video image into a digital signal, and transfers the processed signal to a buffer memory 73 and a memory 74. The electronic image stored in the buffer memory 73 is displayed on the LCD monitor 37. The memory 74 can be freely mounted on the digital camera body 200, and is capable of electric rewriting, so as to keep the memory of the electronic image even when the power supply of the digital camera body 200 is turned off. When the image stored in the memory 74 is monitored, the image data is read from the memory 74 to the buffer memory 73, and output and displayed on the LCD monitor 37.

The operations of the memory 74, the buffer memory 73, the LCD monitor 37, the signal processing circuit 72 and the area sensor driving circuit 76 as explained above, are controlled by the control circuit 75, under the control of the body control circuit 36.

Figure 6:
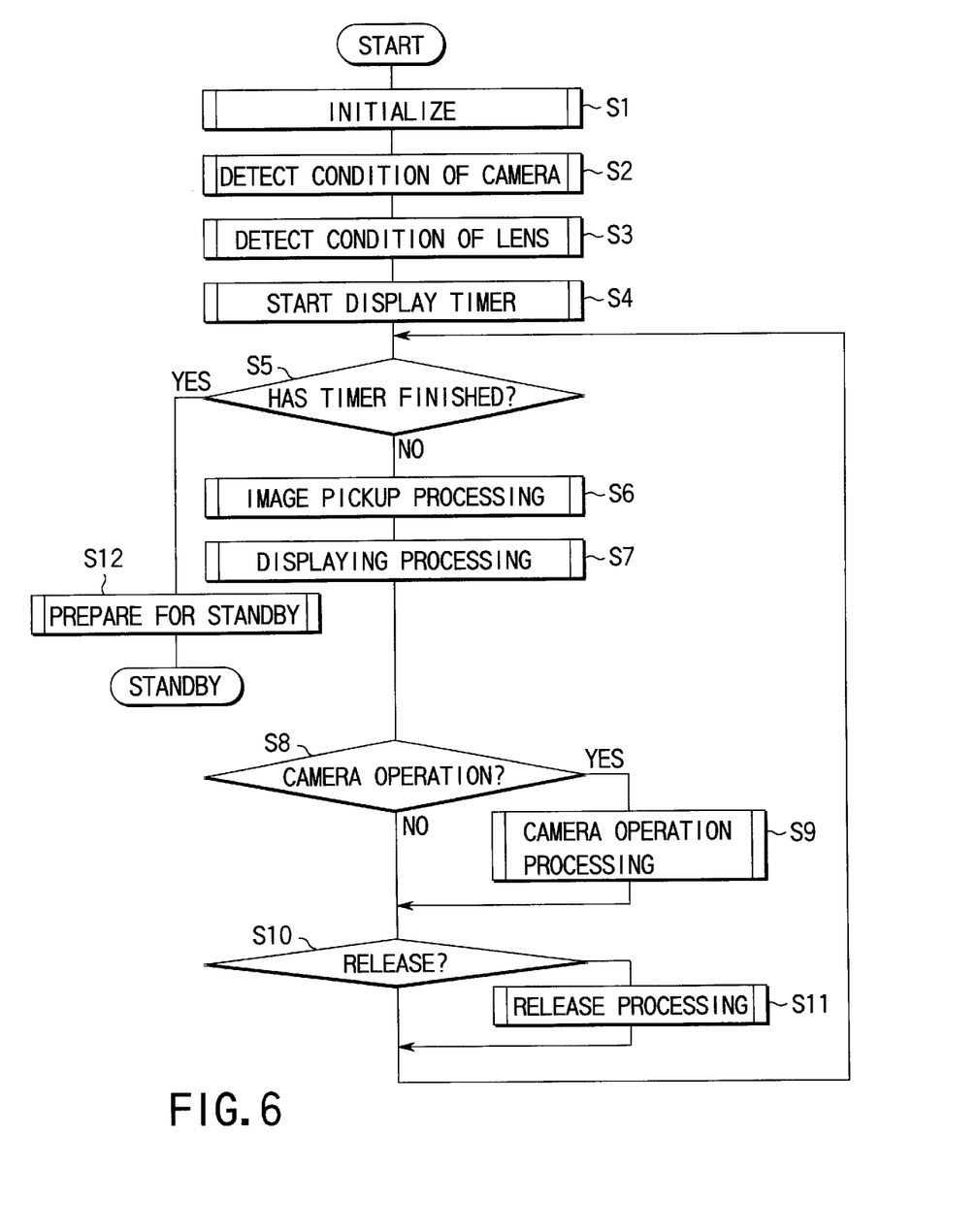
FIG. 6 is a flow chart showing a main sequence of the camera according to the first embodiment.

Next, the main sequence of the first embodiment will be explained with reference to a flow chart of FIG. 6.

For example, when a battery is inserted, a power supply switch (not shown) is turned on or various interrupts occur, the operation of the main sequence first starts to execute initialization of various variables (step SI). Next, the body control circuit 36 detects the condition of the digital camera body 200 (step S2), and detects the connected condition of the interchangeable lens 100, and the like (step S3).

Sequentially, a display timer to allow the operation to become a standby state, in a power saving mode, after a predetermined time has passed, starts (step S4). If the timer has not yet terminated (step S5), a predetermined image pickup processing (step S6) and a displaying processing (step S7) are executed. After that, it is detected whether the camera has been operated or not (step S8).

When the camera is operated, a predetermined camera operation processing is executed in accordance with the operation (step S9). Next, it is detected whether the release operation is executed or not (step S10). When the release operation is made, a predetermined release processing is executed (step S11). On the other hand, when the timer has terminated (step S5), a standby preparation processing for shift of the operation to the power saving mode is executed (step S12). Thus, the operation is shifted to the standby state.

When the connection to the external device is executed, an interrupt signal based on the input of the signal PCVc-ccheck is detected by the body control circuit 36 and, in accordance with this, the external device connection interrupt processing to be described later is started. On the other hand, the communication interrupt processing is acceptable at any time during the main sequence. When the interrupt signal is input, the communication interrupt processing is executed immediately, and the processing returns again to the step which is being executed before the input of the interrupt signal.

Figure 7:
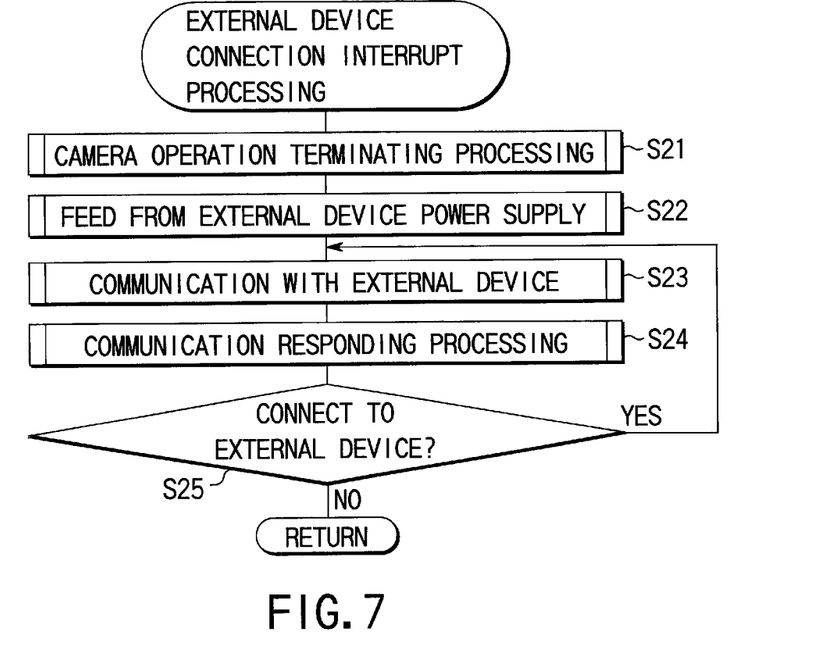
FIG. 7 is a flow chart showing the details of an external device connection interrupt processing.

Next, the sequence of the external device connection interrupt processing will be explained in detail with reference to a flow chart of FIG. 7.

When the signal is input to the terminal PCVcccheck to start the external device connection interrupt processing, a subroutine "camera operation terminating processing" to be described later is first executed, and the current processing which is being executed is terminated so as to be in a communication preparation state (step S21).

Sequentially, the power supply source is switched to the external device side by the power supply control circuit 32 (step S22) and the communication with the external device is executed (step S23). This communication with the external device is executed under the control of the external device side.

Next, a subroutine "communication responding processing" to be described later is executed, so that various processings are executed in response to the communication (step S24). Next, it is detected again whether the external device is connected or not (step S25). If the external device is connected, the processings of steps S23 to S25 are repeated. If the external device is not connected, the processing returns to the main sequence.

Figure 8:
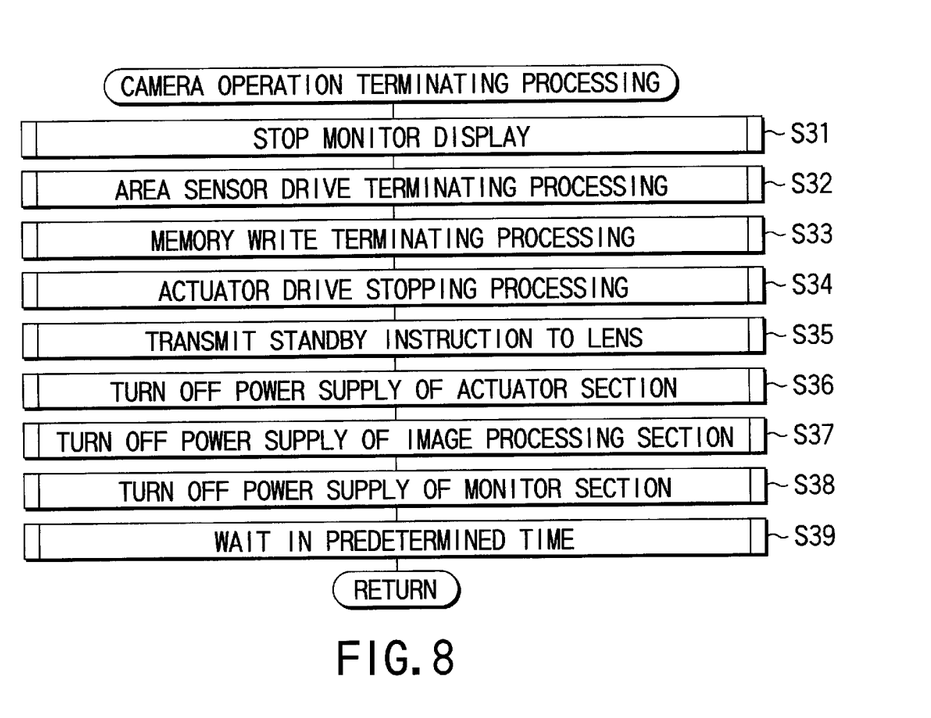
FIG. 8 is a flow chart showing the details of a sequence of a subroutine "camera operation terminating processing"

Next, the sequence of the subroutine "camera operation terminating processing" will be explained in detail with reference to a flow chart of FIG. 8.

In this subroutine, the display of the LCD monitor 37 is stopped (step S31), and the drive of the area sensor 23 is terminated (step S32). The write terminating processing of the memory 74 is executed (step S33), the drive stopping processing of the actuator section is executed (step S34), and a standby instruction is transmitted to the interchangeable lens 100 (step S35).

Next, the power supply of the actuator section is turned off (step S36), the power supply of the image processing circuit 42 is turned off (step S37), the power supply of the LCD monitor 37 is turned off (step S38), and the operation waits during a predetermined time (step S39) and returns.

The circuits such as the actuator section, the image processing circuit 42 and the LCD monitor 37 are included in the camera circuit 52 of FIG. 2, and their power supplies can be controlled separately by the power supply control circuit 32.

The reason why the operation waits during a predetermined time at step S39 is that a small quantity of power is supplied unless a predetermined time passes in a case where a personal computer is connected as the external device via the serial interface of the USB standards. When the serial interface other than the USB is employed, the predetermined time is of course changed.

Figure 9:
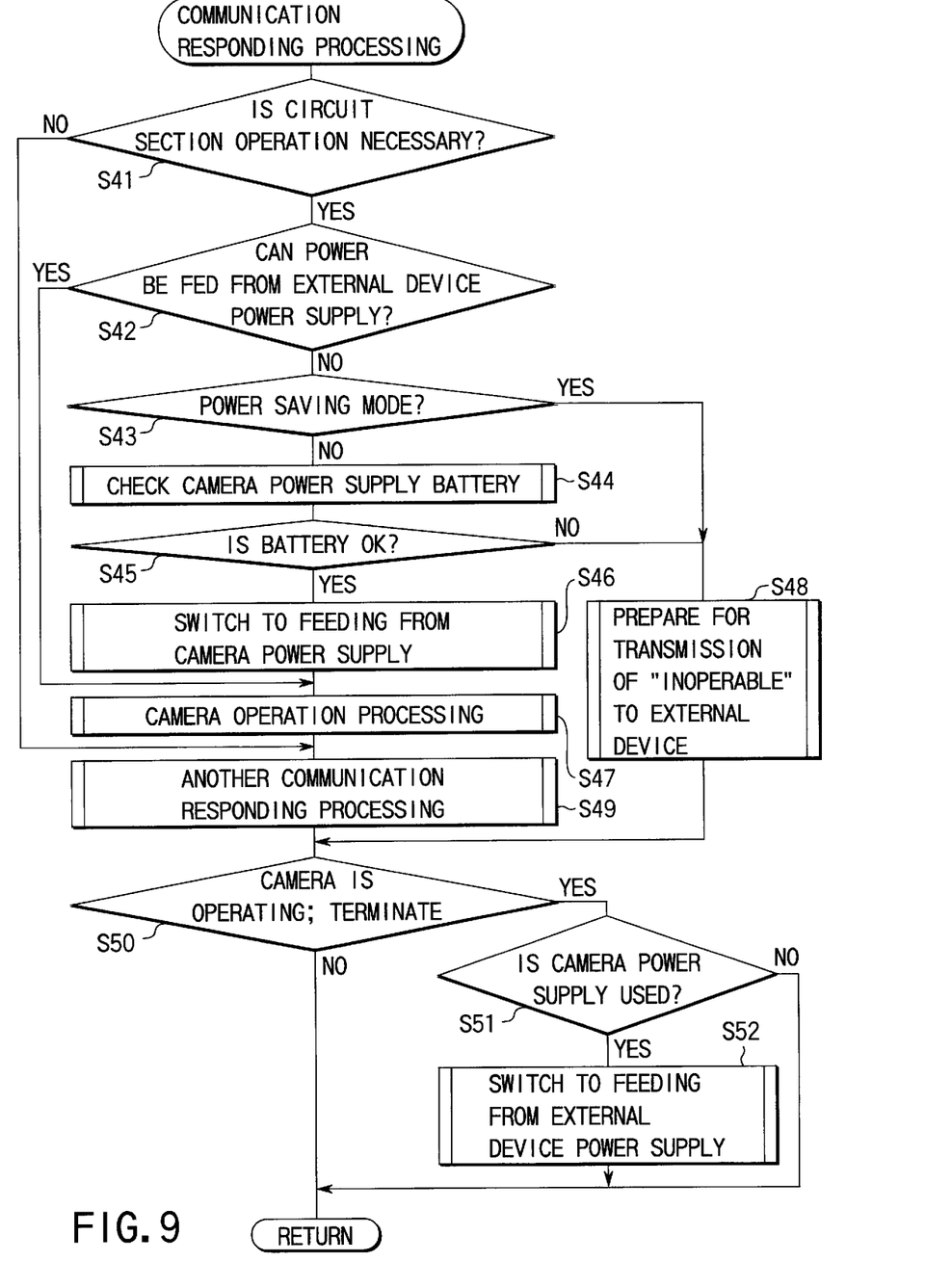
FIG. 9 is a flow chart showing the details of a sequence of a subroutine "communication response processing"

Next, the sequence of the subroutine "communication responding processing" will be explained in detail with reference to a flow chart of FIG. 9. Predetermined processings are executed in response to instructions sent from the external device.

In this subroutine, it is first determined whether the operation of the circuit section is required or not (step S41). If it is not required, the processing shifts to step S49. If it is required, it is determined whether the entire operational currents of the circuits which need to be operated can be fed by the external device power supply (step S42). In the digital camera body 200, the body control circuit 36, which stores in advance the required current of each circuit section in the inner memory, determines this on the basis of the stored values.

This determination is made to prevent the power supply from being switched unnecessarily in a case where the operational current cannot be supplied from the power supply of the external device in accordance with the magnitude of the operation load of the camera. As a result, the power supply is selected in accordance with the operation load.

If the power can be supplied, the processing such as the change of the power supplies is unnecessary and, therefore, the processing shifts to step S47. If the power can be supplied, it is determined whether the operation is in the power saving mode or not (step S43). In the present embodiment, a power saving mode button is included in a part of the switch input circuit 35. The "power saving mode" causes the consumed current of the battery to be reduced. The present embodiment of the power saving mode is set so as not to allow the operation using the battery of the camera to be made during the communications with the external device, in order to save the battery.

Therefore, in the power saving mode, the processing is prepared to transmit "inoperable" to the external device (step S48), and shifts to step S50 to be described later. If the operation at step S43 is not in the power saving mode, the battery of the body power supply 30 is checked (step S44), the battery is discriminated at step S45, and the operation of step S48 is executed if the result of the battery discrimination is not OK (i.e. if the predetermined processing responding to the above communication cannot be executed by the power supply terminal of the camera). If the result of the battery discrimination is OK, the power supply is switched to the body power supply 30 (step S46) and a predetermined camera operation processing is executed in response to the order (step S47).

Then, a processing corresponding to a case where an order of a processing which does not require the operations of the circuit section, is executed (step S49), it is determined whether the camera operation has been terminated or not (step S50). If the camera operation has been terminated, it is determined whether the body power supply 30 is in use or not (step S51). If the body power supply 30 is in use, the supply is switched to the power supply of the external device (step S52) and the processing returns to the main sequence.

If the camera operation has not been terminated at step S50, or if the power supply of the camera is not in use at step S51, the processing returns as it is. The above sequence is set by assuming that the communication may be made during the above operation.

Next, the second embodiment of the present invention will be explained.

Figure 10:
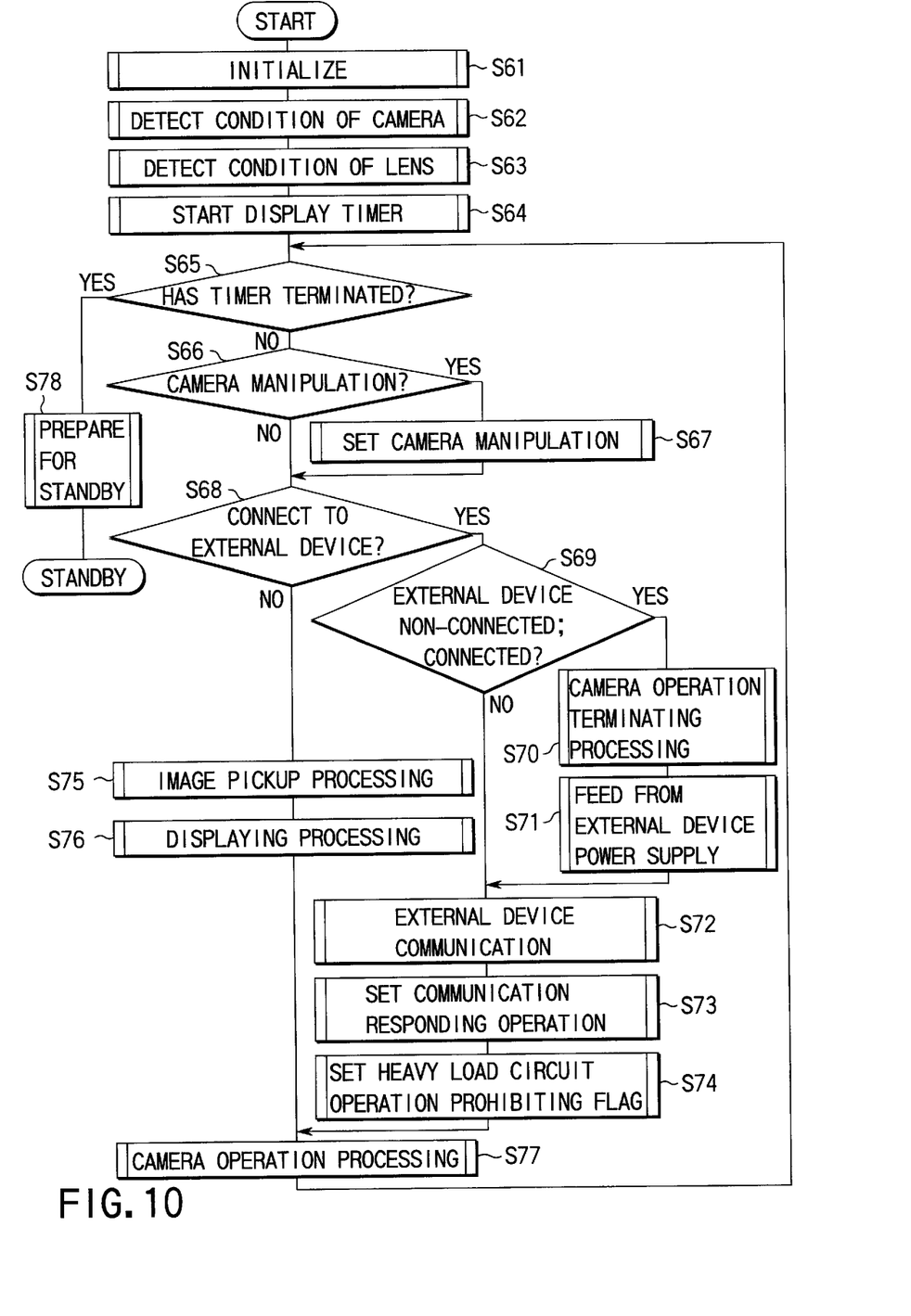
FIG. 10 is a flow chart showing a main sequence of a camera according to a second embodiment.

In the present embodiment, the operation of the camera is set by a camera manipulation setting (step S67) or a communication responding operation setting (step S73), and is executed by the camera operation processing. The detection of the external device is not executed by the communication interrupt. Further, when the external device is connected, an operation prohibition flag is made to stand. In the camera operation processing, the operation is set by the camera manipulation setting and the communication responding operation setting, but it is not executed while the prohibition flag stands.

These characteristics will be explained below in detail.

FIG. 10 is a flow chart showing the main sequence of the camera according to the second embodiment of the present invention. The processings of steps S61 to S66 are the same as the above-described processings of steps S1 to S4 and S8 of FIG. 6, and their detailed explanations are therefore omitted.

At step S67, the operation of the camera is set to be operated in accordance with the camera manipulation. The camera operation which is set here in response to the camera manipulation is processed at step S77 as described later.

Whether the external device is connected is not discriminated by the communication interrupt, but by detection of the connection of the external device (step S68). If it is discriminated from this discrimination that the external device is connected, it is detected whether the non-connected state of the external device is changed to the connected state thereof (step S69). When such a change occurs, the camera operation terminating processing is executed (step S70), the power supply is switched to that of the external device (step S71), and the external device communications are executed (step S72).

In addition, the communication responding operation setting is executed to make the operation responding to the communication (step S73), and the heavy load circuit operation prohibiting flag setting is executed (step S74). In the present embodiment, prohibiting flags are provided to prohibit the image pickup processing, writing processing, actuator operation processing, focusing processing, shutter operation, monitor display processing, and the like. If a prohibiting flag is 1, its related processing is prohibited.

In the present embodiment, all the operations of the heavy load circuit are prohibited in the sequence as described above. However, the circuit may be operated within a range in which the sum of the operational currents of the load does not exceed a predetermined value (i.e. a maximal current value that can be fed from the external device).

A structure of preparing a rewritable nonvolatile memory such as an EEPROM in the camera or the like and storing the prohibited operations therein at the time of communications, can be also conceived.

In this case, the structure has a degree of freedom to be able to rewrite the prohibited operations.

Subsequently, a subroutine "camera operation processing" to be described later is executed (step S77) and the processing shifts to step S65.

If it is discriminated at step S68 that the connection of the external device is not detected, the image pickup processing (step S75) and the displaying processing (step S76) are executed similarly to those shown in FIG. 6, the subroutine "camera operation processing" to be described later is executed (step S77), and the processing returns to step S65.

Figure 11:
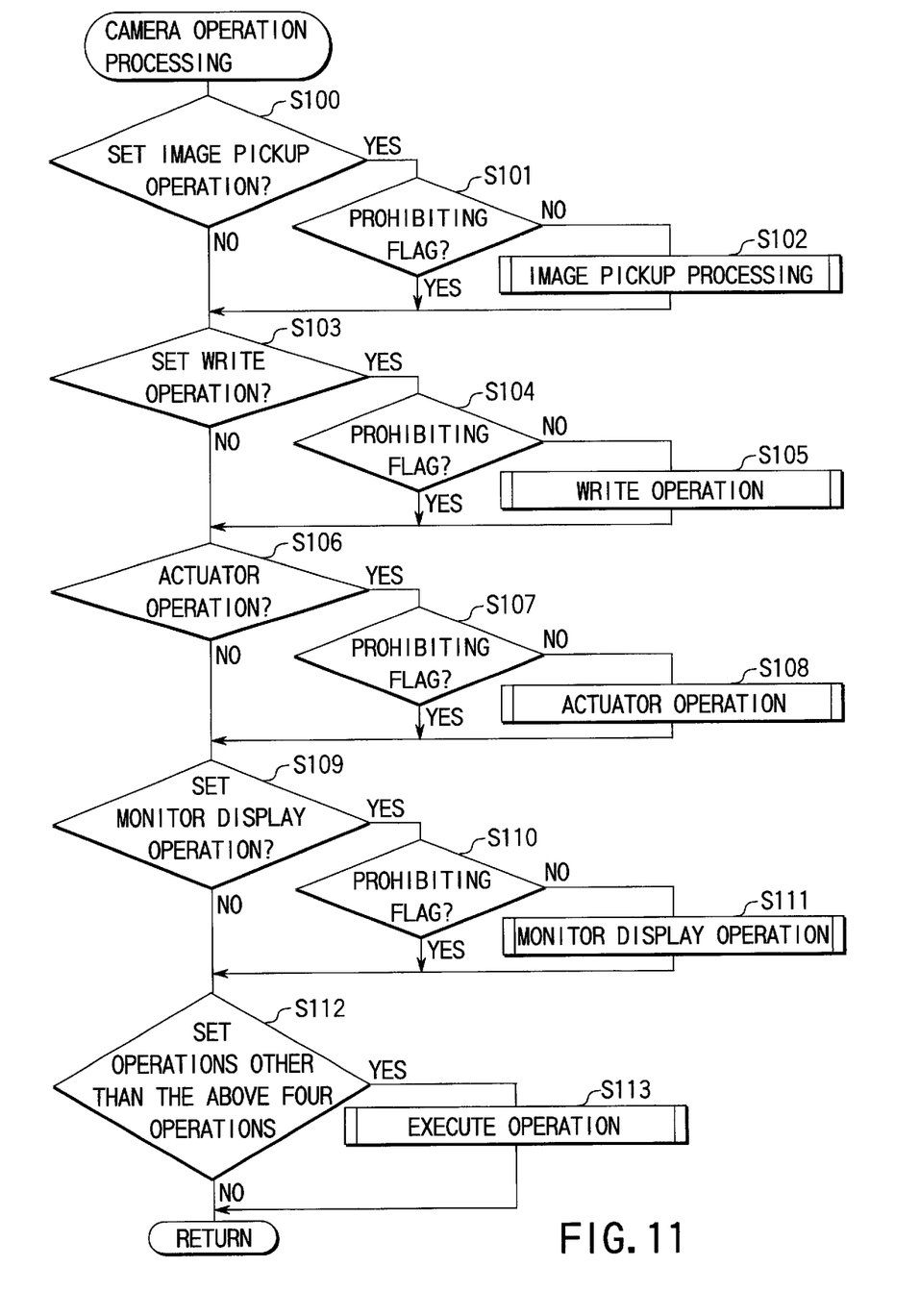
FIG. 11 is a flow chart showing a sequence of a subroutine "camera operation processing"

Next, the sequence of the subroutine "camera operation processing" will be explained with reference to a flow chart of FIG. 11.

It is detected whether the image pickup operation has been set or not (step S100). If the setting has been executed, it is detected whether a prohibiting flag stands or not (step S101). If the flag does not stand, the predetermined image pickup operation is executed (step S102) and the processing shifts to next step S103.

If the image pickup operation setting is not executed at step S100, or if a prohibiting flag stands at step S101, the processing shifts to step S103 as it is. Next, it is detected whether the writing operation setting is executed or not (step S103). If the setting is executed, it is detected whether a prohibiting flag stands or not (step S104). If the prohibiting flag does not stand, the predetermined writing operation is executed (step S105), and the processing shifts to step S106. If the writing operation setting is not made at step S103, or if the prohibiting flag stands at step S104, the processing shifts to step S106 as it is.

Next, it is detected whether the actuator operation setting is executed or not (step S106). If the setting is made, it is detected whether a prohibiting flag stands or not (step S107). If the prohibiting flag does not stand, the predetermined actuator operation is executed (step S108), and the processing shifts to step S109. If the actuator operation setting is not made at step S106, or if the prohibiting flag stands at step S107, the processing shifts to step S109 as it is.

Next, it is detected whether the monitor display operation setting is executed or not (step S109). If the setting is not made, it is detected whether a prohibiting flag stands or not (step S110). If the prohibiting flag does not stand, the predetermined monitor display operation is executed (step S111), and the processing shifts to step S112. If the monitor display operation setting is not made at step S109, or if the prohibiting flag stands at step S110, the processing shifts to step S112 as it is.

Next, it is detected whether the operation setting other than the actuator operation is executed or not (step S112). If the operation setting is made, a predetermined operation is executed (step S113), and the processing returns.

The characteristics of the above-explained second embodiment is not the interrupt processing, but detection of the state at any time. Another characteristic is to use the power supply of the external device side at any time when the communications with the external device are made. The other one is to prohibit the operation when the condition which cannot be compensated by the power supply from the external device occurs.

Therefore, low-power consumption operations can be implemented without a complicated structure, as compared with the first embodiment. That is, no interrupt terminal is required in the present embodiment.

Next, the third embodiment of the present invention will be explained.

Figure 12:
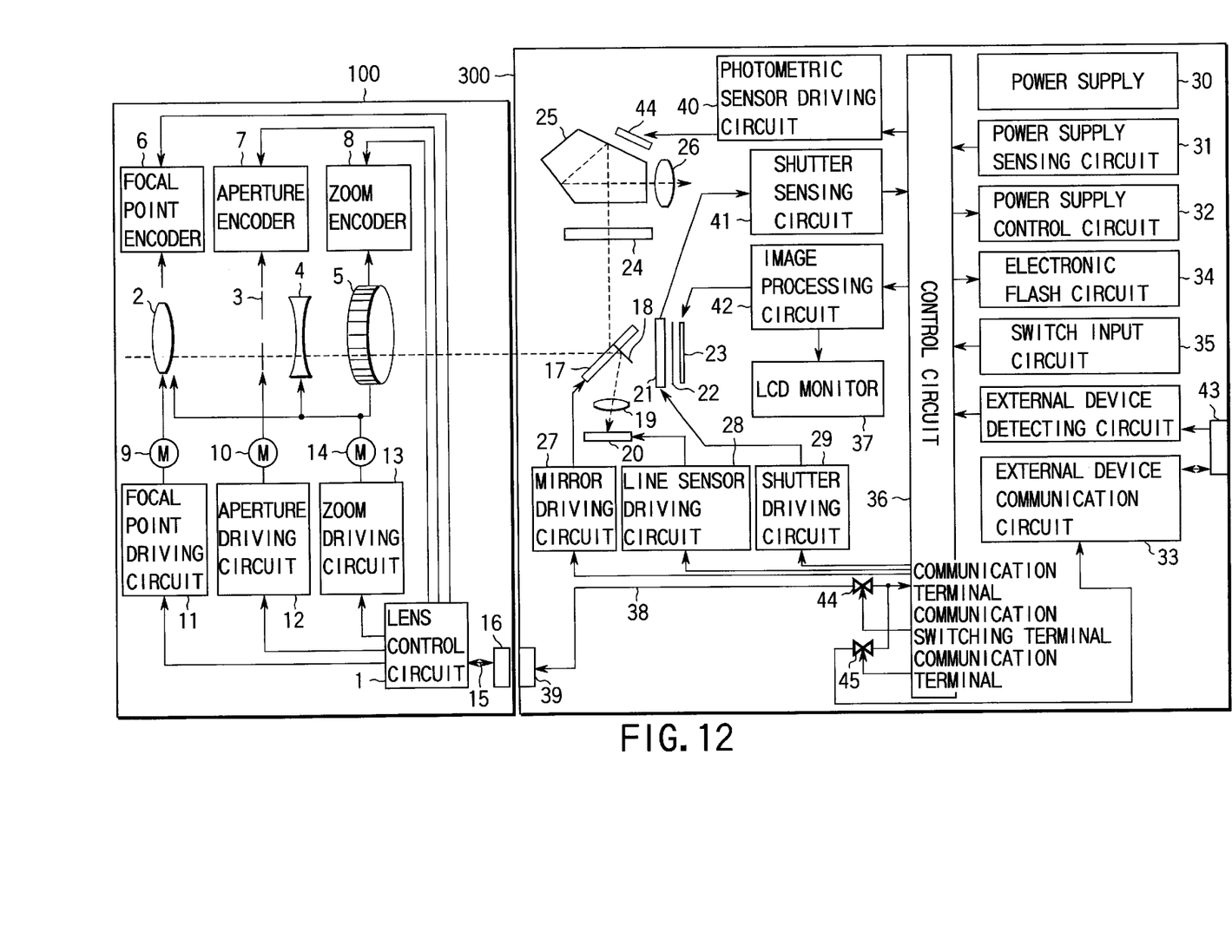
FIG. 12 is a block diagram showing a structure of a camera according to a third embodiment.

FIG. 12 is a block diagram showing the structure of the third embodiment.

The serial communication terminals, or communication terminals in the control circuit are used for the communications with the external device. Therefore, the terminals may short and the communications cannot be thereby made in the communications with the interchangeable lens 100.

In the third embodiment, the terminals for the communications with the external device and for the communications with the interchangeable lens 100 are shared, and controlled by the body control circuit 36.

When mounting the external device is detected, a predetermined signal is output from the communication switching terminal, to turn off a switch 46 and turn on a switch 45. On the other hand, in a case where mounting the external device is not detected, a predetermined signal is output from the communication switching terminal, to turn on the switch 46 and turn off the switch 45, and thereby the communications with the lens can be made.

There is an advantage that the communication terminals can be saved. The lens does not need to be operated when the communications with the external device are made, and therefore, the communication terminals can be used effectively.

The embodiments of the preset invention have been explained above, but the present invention is not limited to those. The present invention can be variously improved and modified within a range which does not exceed the gist of the present invention. For example, the serial interface does not need to be limited to the above-described standards, but can be variously employed.

Moreover, the present invention is not limited to the application to a camera of the lens exchanging type, but can be also applied to a camera of the lens-integral type.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera capable of being operatively connected to an external device for communicating with the external device and executing various processings corresponding to the communication, said camera comprising:

a plurality of electric circuits for executing a predetermined camera operation;

a power supply in said camera;

a connection terminal or connecting the camera to the external device, the connection terminal comprising a communication terminal communicating with the external device and a power terminal receiving power supplied from a power supply of the external device;

a control circuit comprising a memory which stores required current values for the plurality of electric circuits; and a power supply control circuit for selecting any one of said power supply in said camera and said external device power supply connected via said connection terminal as a power supply for said plurality of electric circuits, the power supply control circuit discriminating a sum of the required current values for executing the various processings from information stored in the control circuit memory and selecting any one of said power supply in said camera and said external device power supply in accordance with the discrimination result when the power supply control circuit executes the processings corresponding to the communication with the external device.

2. A camera system having a camera and an external device which can be connected to said camera, said external device comprising:
   an external device side communication terminal for making electric connection with said camera; and
   a power supply circuit, said camera comprising:
   a camera side connection terminal for making electric connection with said external device;
   a plurality of electric circuits for executing a predetermined camera operation corresponding to communication with the external device;
   a control circuit comprising a memory which stores required current values for the plurality of electric circuits;
   a power supply in said camera; and
   a power supply control circuit for selecting any one of said power supply in said camera and said external device power supply connected via said connection terminal as a power supply for said plurality of electric circuits, the power supply control circuit discriminating, in accordance with the required current values of the plurality of electric circuits stored in the control circuit, whether a sum of operation currents of the electric circuits can be supplied from the external device when the control circuit executes the predetermined camera operation corresponding to the communication, the power supply control circuit selecting the power supply of the external device if the sum of the operation currents can be supplied from the external device and selecting the power supply in the camera if the sum of the operation currents cannot be supplied from the external device power supply but can be supplied from the power supply in the camera.

* * * * *